United States Patent [19]

Bruggeman et al.

[11] Patent Number: 4,876,875

[45] Date of Patent: Oct. 31, 1989

[54] SUPPORTED CERAMIC GUIDE ROLLER

[75] Inventors: Rudyard J. Bruggeman, Arvada; Gregory A. Carscallen, Lakewood, both of Colo.

[73] Assignee: Coors Porcelain Company, Golden, Colo.

[21] Appl. No.: 130,109

[22] Filed: Dec. 4, 1987

[51] Int. Cl.[4] .................. B21B 27/02; B21B 27/06; B21B 39/14

[52] U.S. Cl. .................................. 72/199; 29/125; 29/130; 29/132; 72/200; 72/250

[58] Field of Search .............. 72/199, 365, 366, 250, 72/200, 202; 29/130, 132, 125

[56] References Cited

U.S. PATENT DOCUMENTS

| | | | |
|---|---|---|---|
| 2,984,473 | 5/1961 | Ornitz et al. | 263/6 |
| 3,432,146 | 3/1969 | Schubert et al. | 254/150 |
| 3,461,527 | 8/1969 | Strandell | 29/132 X |
| 3,511,482 | 5/1970 | Haite | 263/6 |
| 3,577,619 | 5/1971 | Strandell | 29/132 X |
| 3,609,849 | 10/1971 | Krol | 29/132 |
| 3,616,671 | 11/1971 | Notari | 72/237 |
| 3,618,357 | 11/1971 | Beninga | 72/289 |
| 3,621,698 | 4/1970 | Rocco et al. | 72/289 |
| 3,667,096 | 6/1972 | Edsmar | 29/125 |
| 3,772,749 | 11/1973 | Loqvist | 29/130 |
| 3,807,012 | 4/1974 | Loqvist | 29/132 X |
| 3,847,763 | 11/1974 | Svenesson | 29/132 X |
| 3,953,914 | 5/1976 | Huber et al. | 29/125 X |
| 3,967,017 | 6/1976 | Martea | 427/405 |
| 3,974,555 | 8/1976 | Strohmeier et al. | 29/132 |
| 4,056,837 | 11/1977 | Cassard et al. | 29/132 |
| 4,111,026 | 9/1978 | Ford et al. | 72/289 |
| 4,137,106 | 1/1979 | Doi et al. | 29/132 X |
| 4,274,185 | 6/1981 | Mifune | 29/123 |
| 4,421,482 | 12/1983 | McMaster | 432/246 |
| 4,526,618 | 7/1985 | Keshavan | 106/1.05 |
| 4,589,884 | 10/1987 | Evans | 29/132 |
| 4,704,776 | 11/1987 | Watanabe et al. | 29/132 |

FOREIGN PATENT DOCUMENTS

| | | | |
|---|---|---|---|
| 0123490 | 10/1984 | European Pat. Off. | 29/132 |
| 2536354 | 3/1976 | Fed. Rep. of Germany | 29/132 |
| 60-058804 | 4/1985 | Japan . | |
| 61-086306 | 5/1986 | Japan . | |

OTHER PUBLICATIONS

"Coors Ceramics—Materials for Tough Jobs", Coors Ceramics Company, Structural Division.
"Magnesia—Partially Stabilized Zirconia: The Influence of Heat Treatment on Thermomechanical Properties", R. H. J. Hannink, et al., J. Australian Ceramic Soc., vol. 18, No. 2, pp. 53–62, 1982.
"Raritan's High Speed Roll Mill," Iron and Steel Engineer, Foley, Feb. 1981, pp. 45–48.
"Roll—Pass Design," Chapter 16, Ferrous Wire Hand Book, Gould, pp. 370–382.

Primary Examiner—Robert L. Spruill
Assistant Examiner—Steven B. Katz
Attorney, Agent, or Firm—Sheridan, Ross & McIntosh

[57] ABSTRACT

A supported ceramic roller and a method for production and use thereof is provided, particularly as a guide roller in a non-ferrous rolling mill. A ceramic roller member is attached to a backing member, preferably metallic, by an adhesive which has the characteristic of acting as a thermal/mechanical stress barrier. The sidewalls of the ceramic roller member extend radially outward of the support member.

19 Claims, 4 Drawing Sheets

SUPPORTED CERAMIC GUIDE ROLLER

FIELD OF THE INVENTION

The present invention relates to a ceramic roller and particularly a roller including a metallic support piece usable as a guide roller in non-ferrous rolling mills.

BACKGROUND INFORMATION

Rollers are widely used for materials processing including conveying, supporting and/or deforming material. In one such application, rollers are used to guide and/or support linear material as it is processed through a rolling mill such as a continuous casting and rolling mill for copper, aluminum or steel. Such guide rollers are known and used in non-ferrous rolling mills manufactured by, among others, Ashlow Engineering Ltd. of Sheffield England, Morgan Construction Company of Connecticut and Morgensheimer Company. One example of such guide rollers are rollers used in entry guides. Other rollers, including pinch rollers, 90 degree rollers for bending and changing the direction of a work piece, shaping rollers, are well known in the rolling mill art. Many rollers in such applications are made of a metallic material, often steel. Such rollers, however, are subject to a number of shortcomings. Metallic rollers are subject to large stress, pressure and abrasion in a hot and sometimes corrosive environment and thus are subject to degradation by wear, abrasion, or deformation. Such degradation can deform the product, interfere with the desired free rotation of the roller, and affect operation of other portions of the apparatus such as the bearings. Additionally, metallic rollers can contaminate the product such as by causing metallic deposits on the product.

The average useful life of a metallic roller will vary with the type and function of the roller and with the type of rolling mill. In one particular continuous copper rolling mill, for producing copper rod, it has been found that metal entry guide rollers have an average useful life of about a half week.

Other undesirable features of metal rollers are that they are typically expensive and have a relatively high density, particularly when made of steel, so that the rotating roller experiences high rotational inertia.

Rollers have also been provided which are made entirely of ceramic. However, the ceramic materials used, are relatively brittle and the rollers are subject to catastrophic failure. Analysis of such failures has provided indications that at least some failures propagate from the interior surface radially outward. It is thought that such failure may be related to stress which is caused in the ceramic when a bearing is press-fitted into the ceramic roller. It has also been found that an all-ceramic roller will sometimes fail when a new workpiece, such a new rod, is being threaded through the rolling mill. During such a threading process a rod, which is typically heated to a high temperature such as about 1100° –1200° F. (about 600° to 650° .C) strikes the roller, often with substantial force.

Other rotating devices containing ceramic are known but each has qualities which make it undesirable for use as a guide roller. U.S. Pat. No. 4,056,873 issued Nov. 8, 1977 to Cassard describes a guide roller for a rolling mill in which a ceramic annular ring is mounted on a core and held in place by first and second shoulders covering the side surfaces of the ceramic ring. The ring is placed against a first shoulder of the core and the second shoulder of the core is formed by stamping, followed by cold-boring the core to expand it and eliminate radial clearance providing the core and the ring with radial integrity. This forming process is expensive and causes stress on the ceramic ring. Moreover, it requires that non-ceramic sidewalls be provided. Such sidewalls are undesirable because providing masses larger distances from the roller rotational axis increases the rotational inertia, which may in turn require use of a softer and/or more expensive metallic material than e.g., steel, as described in U.S. Pat. No. 4,056,873. Additionally, the side pieces require some amount of axial space, thus requiring either a thinner ceramic roller than would otherwise be possible or an increase in the space permitted for mounting the roller, often, in turn, requiring modification of the rolling mill apparatus. Indeed the space constraints in existing rolling mills would not allow ceramic guide rollers with side plates because side plates would require that the ceramic portion be made undesirably thin and/or would require expensive modification of existing rolling mill apparatus. Additionally provision of non-ceramic sidewalls contacting portions of the sidewalls of the ceramic part can cause stress on the ceramic due to different amounts of thermal expansion as the roller is heated.

Other configurations in which a ceramic piece is held between side pieces of another material, such as metallic material, include draw blocks and capstans such as those described in U.S. Pat. No. 4,111,026 issued Sept 5, 1978 to Ford, et al., U.S. Pat. No. 3,621,698 issued Nov. 23, 1971 to Rocco, et al., U.S. Pat. No. 3,618,35 issued Nov. 9, 1971 to Beninga and U.S. Pat. No 3,432,164 issued Mar. 11, 1969 to Schubert, et al. In these configurations, the metallic side pieces cause high rotational inertia, thermal/mechanical stress on the ceramic and require provision for axial thickness of the side pieces. Furthermore, these devices employ fasteners such as bolts for holding the ceramic between the side pieces, thus requiring either undesirable changes in the configuration of the ceramic pieces (such as hole therethrough or relatively thin ceramic rings) or a special configuration of the shaft or bearing as in U.S. Pat No. 3,621,698. Furthermore, providing bolts or other fastening devices spaced from the axis of rotation of the roller further increases the rotational inertia of the roller.

Another approach to providing rotating parts involves coating a metal body with a ceramic material as described, for example, in U.S. Pats. No. 3,974,555 issued Aug. 17, 1976 to Strohmeier, et al. and U.S. Pat. No. 2,984,473 issued May 16, 1961 to Ornitz, et al. Such coated parts, however, also have a number of shortcomings. Because the coating is in integral contact with the metallic portion, cracking, lifting or other failure of the ceramic can occur because of the different amounts of thermal expansion of the ceramic and the metal. Typically, a ceramic coating is relatively thin and therefore has less longevity than a thicker ceramic part. Coating of a metallic piece is typically difficult and expensive and places constraints on the materials used because not all ceramics can be successfully coated on all metallic substrates. Additionally, because the coated part is largely metallic, the part typically has a high rotational inertia requiring more expensive bearings and/or providing an undesired amount of friction or slippage between the workpiece and the roller.

In view of the above, there is a need for a roller which is long-lasting, particularly in hot and/or corrosive environments, is relatively easy and inexpensive to make, has a relatively low rotational inertia, and can be used in existing systems such as existing rolling mill apparatus without extensive modifications thereof.

SUMMARY OF THE INVENTION

The present invention involves providing a roller which is substantially composed of a ceramic material but which is backed by a second material, preferably metal. According to this invention, the problems previously found in the provision of the sidewalls and the problem of thermal/mechanical stress on the ceramic are mitigated or eliminated by providing a third material between the ceramic and the backing or support member. The third material has two functions or characteristics, namely that it is an adhesive with respect to both the ceramic and the backing or support material and it provides a thermal/mechanical stress barrier between the ceramic part and the support member.

DETAILED DESCRIPTION

Figure 1:
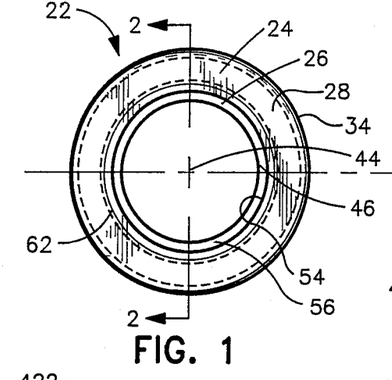
FIG. 1 is a side elevational view of a roller according to one embodiment of the invention.
Figure 2:
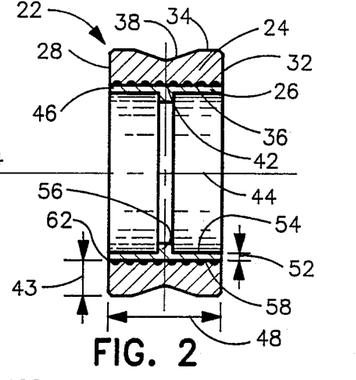
FIG. 2 is a cross sectional view of the embodiment depicted in FIG. 1 taken along line 2—2 of FIG. 1.
Figure 3:
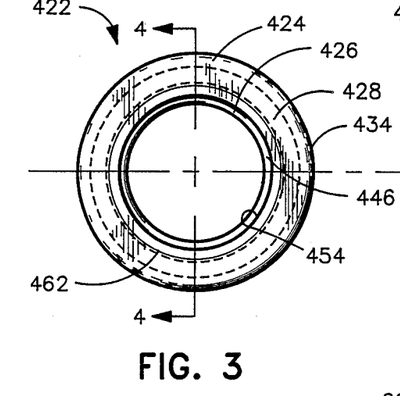
FIG. 3 is a side elevational view of another embodiment of the present invention.
Figure 4:
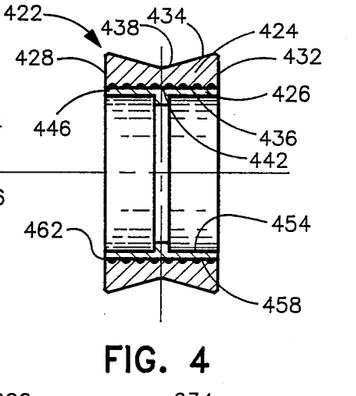
FIG. 4 is a cross sectional view taken along line 4—4 of FIG. 3.
Figure 5:
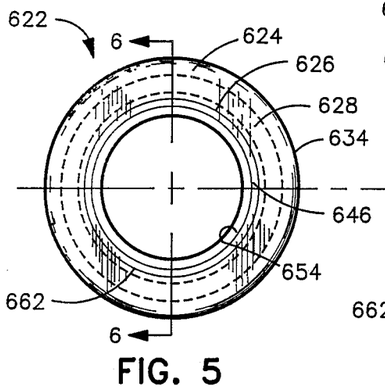
FIG. 5 is a side elevational view of another embodiment of the present invention.
Figure 6:
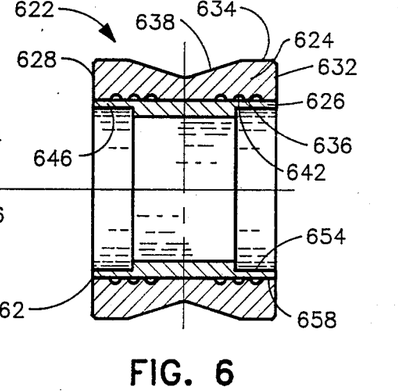
FIG. 6 is a cross sectional view taken along line 6—6 of FIG. 5.
Figure 7:
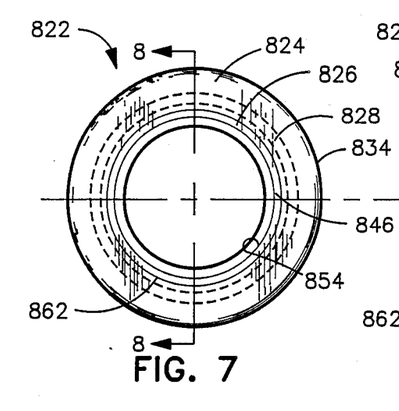
FIG. 7 is a side elevational view of another embodiment of the present invention.
Figure 8:
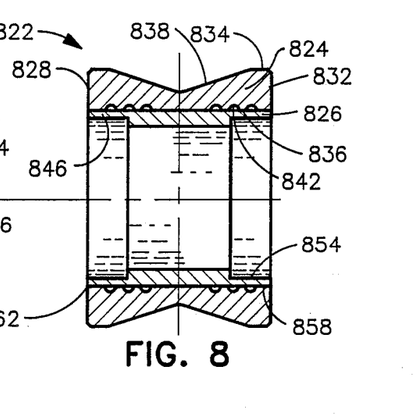
FIG. 8 is a cross sectional view taken along line 8—8 of FIG. 7.
Figure 9:
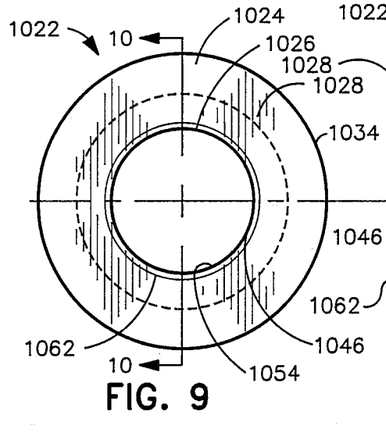
FIG. 9 is a side elevational view of another embodiment of the present invention.
Figure 10:
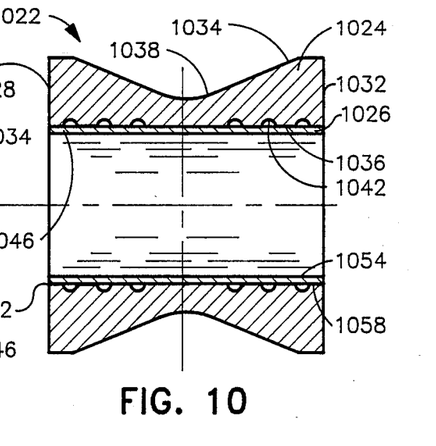
FIG. 10 is a cross sectional view taken along line 10—10 of FIG. 9.
Figure 11:
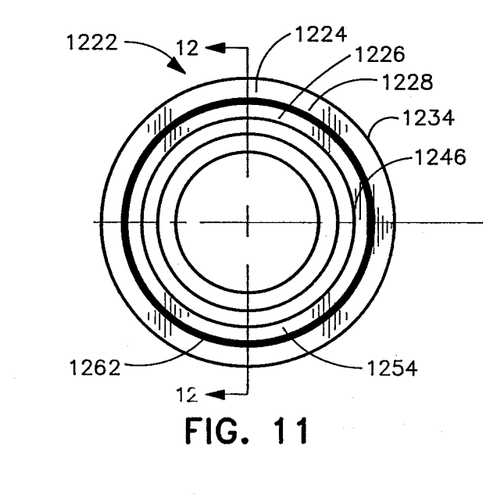
FIG. 11 is a side elevational view of another embodiment of the present invention.
Figure 12:
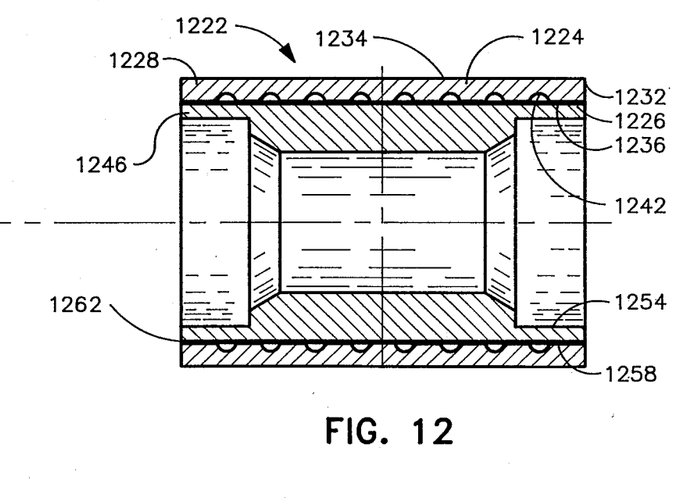
FIG. 12 is a cross sectional view taken along line 12—12 of FIG. 11.

Referring now to FIG. 1, a roller 22 includes an annulus-shaped member 24 (i.e. substantially containable in an imaginary annular envelope) and a support member 26. Referring to FIG. 2, the annulus-shaped member 24 has first and second side surfaces 28, 32, an outer circumferential surface 34 and an inner circumferential surface 36. In the embodiment depicted in FIG. 2, the outer circumferential surface 34 has a circumferential recess 38 formed therein. The inner circumferential surface 36 has a plurality of grooves 42 formed therein. The annulus-shaped member 24 comprises a ceramic material. The grooves 42 are provided to assist in adhering the annulus-shaped member 24 to the support member 26, and in the depicted embodiment, are about 0.1 inches (about 2.5 mm) deep.

Preferably, the annulus-shaped member is substantially all ceramic, although it can also be provided with other materials such as reinforcing fibers or whiskers. The ceramic material is preferably zirconia and most preferably a toughened zirconia such as that described generally in R.H.J. Hannink and N.V. Swain "Magnesia-Partially Stablized Zirconia", *J. Australian Ceramic Soc.*, Vol. 18, No. 2, pp. 53–62, 1982, incorporated herein by reference or "Transformation Toughened Zirconia" (T.T.Z.) produced by Coors Ceramic Golden, Colo. Other materials which are operable for rolling mill applications include silicon nitride and silicon aluminum oxynitride (sialon). Additionally, it is believed that other ceramic materials can be used, particularly in applications where high temperatures or corrosive environments are less involved, including alumina, carbides such as silicon carbide, other nitrides and other oxides such as beryllium oxide.

The axial length, radial thickness and configuration of the annulus-shaped member 24 will vary depending on the application and function of the roller. In the embodiment depicted in FIG. 2, the axial length 48 is about 1 inch (about 25 mm), and the radial thickness 43 is about 0.3 inches (about 7.5 mm).

The annulus-shaped member 24, as seen from FIG. 2 need not be exactly in the shape of an annulus and can have other cross sectional shapes than that depicted in FIG. 2, including rectangular, circular, oval, concave and convex. The annulus-shaped member 24 is configured such that at least a portion of at least one of the sidewalls 28, 32 extends radially outward (i.e. in a direction away from the rotation axis 44) from the support member 26. In other configurations of the annulus shaped member 24, the sidewalls 28, 32 may have different configurations or positions than that depicted in FIG. 2, as long as at least some portion of the annulus shaped member 24 extends radially outward from the support member 26, i.e. the support member 26 does not include side portions which extend completely over the side surfaces 28, 32 of the annulus-shaped member 24.

The annulus-shaped member 24 can be formed by any of a number of ceramic-forming processes well known in the ceramic art including hot-pressing, pressureless sintering, and hot isostatic pressing. Preferably, ceramic powder is first formed into a green body which is of such a size and shape that, after shrinkage during firing the finished ceramic product will have substantially the desired final configuration. Preferably, the green body is machined, such as on a lathe, to form the grooves 4 in the inner circumferential surface 36, before firing.

The axial length, radial thickness and configuration of the support member 26 will depend at least partly on the use of the roller and the type and configuration of the bearing to be fitted therein. In the embodiment depicted in FIG. 2, the support member includes an annulus shaped plate 46 having an axial length 48 substantially equal to the axial length of the annulus-shaped member 24. In the embodiment depicted in FIG. 2, the thickness 52 is about 0.1 inches (about 2.5 mm).

The configuration of the interior surface 54 of the support member 26 is shaped to accommodate the mounting of the roller 22, such as by fitting a bearing therein. In the embodiment depicted in FIG. 2, a rib 5 extends radially inward from the inner surface 54 of the support member 26. The outer surface 58 of the support member 26 has a radius slightly less than the radius of the inner circumferential surface 36 of the annulus shaped member 24, thereby defining a space at the interface 62 between the annulus-shaped member 24 and the support member 26.

The support member 26 can be formed of a variety of materials. The preferred material is a metal, most pre erably steel because of its ability to provide the desired support function at low cost. Other metallic materials which can be used include aluminum, magnesium, titanium and alloys thereof.

An adhesive material is provided in the space at the interface 62 between the annulus-shaped member 24 and the support member 26. The adhesive material can be any material which has two properties or functions. First, the material must be adhesive with respect to both the annulus-shaped member 24 and the support member 26. Second, the material must provide a thermal/mechanical stress barrier between the annulus-shaped member and the support member 26. It is critical that the material retains sufficient adhesive and stress barrier properties to operate successfully under such operating conditions as, elevated temperatures and/or corrosive environments. In particular, the materials should retain its adhesive and stress barrier properties at the temperatures it will attain during use, such as use in non-ferrous rolling mills where the stock may have a temperature of 1100° F. to 1200° F. (600° C. to 650° C.) or more. The annulus-shaped member 24 should provide some thermal protection to the adhesive material. The temperature attained at the location of the adhesive material is difficult to determine and is not known exactly.

In the preferred embodiment, the adhesive material is an epoxy, particularly such as the epoxy sold under the trade name A2 by Armstrong Company. This epoxy is an example of a material which has been found to have the described adhesive and stress barrier properties. The manner in which this material operates as a stress barrier is not precisely known, although it is believed that the material will deform so as to reduce the amount of stress transmitted to the annulus-shaped member 24 when the support member 26 is subjected to a stress such as thermal/mechanical stress from, e.g., fitting a bearing therein or differential thermal expansion.

The roller 22 can be assembled in any of a number of manners. One manner of assembly includes forming the annulus-shaped member as described above; forming the support member by, for example, machining, stamping or casting; placing a layer of adhesive material on the inner circumferential surface 36 of the annulus-shaped member 24 and/or the outer surface 58 of the support member 26 and pressing the support member 26 into the annulus-shaped member 24 to assume the position depicted in FIG. 2. Depending upon the nature of the adhesive, it may be necessary to dry and/or cure the adhesive, such as by application of heat.

Figure 13:
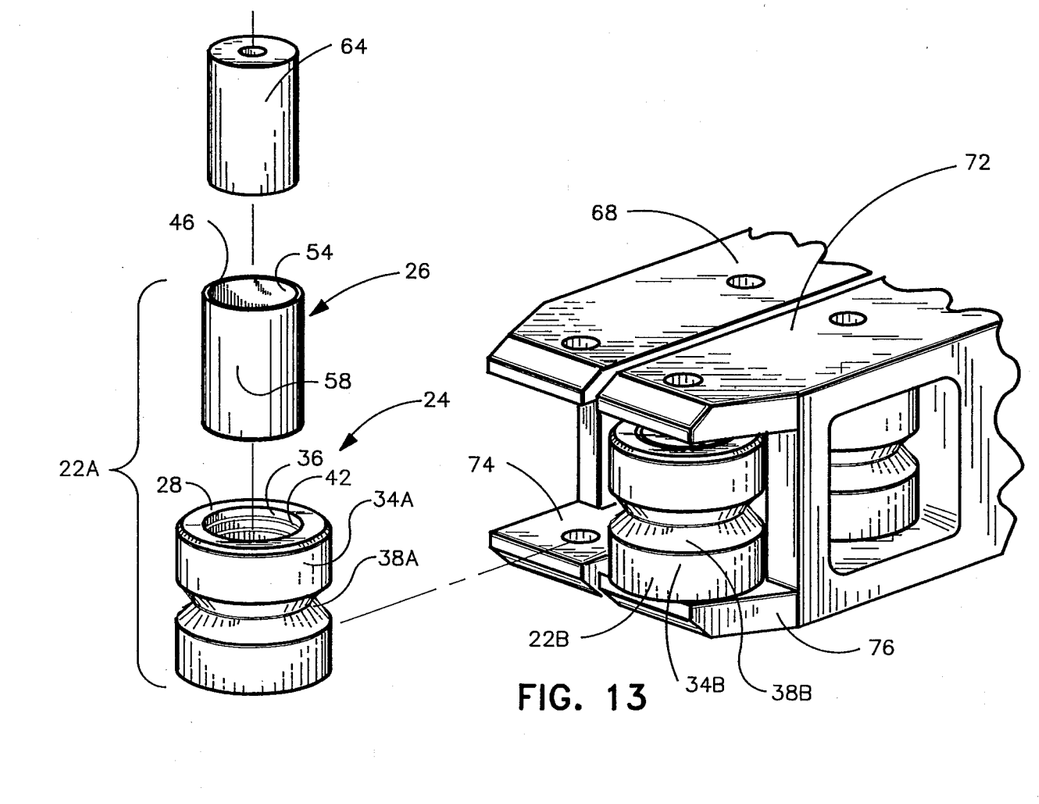
FIG. 13 is a partially exploded perspective view of an entry guide showing a roller mounted thereon.

Mounting of the roller 22 onto the rolling mill or other application is done in a manner which will vary with the type of roller and type of mill or other application. Referring now to FIG. 13, one type of mounting will be described. Following assembly of the roller by assembling the annular-shaped member 24 with the support member 26, a bearing 64 is attached to the support member 26 by well known methods such as press-fitting. The roller/bearing assembly is then mounted on the mill apparatus, such as an entry guide in the same position and in the same manner as previously-known rollers were mounted. As depicted in FIG. 13, the roller/bearing assemblies are mounted between upper arms 68, 72 and lower arms 74, 76. As depicted in FIG. 13, two rollers 22a, 22b are mounted such that the outer circumferential surfaces 34a, 34b are spaced apart to define space therebetween. Preferably, and as indicated in FIG. 13, the rollers 22a, 22b are mounted so as to rotate about substantially parallel axes. A portion of the work material, such as a deformable material like copper rod, is moved through the space between the first and second rollers 22a and 22b so as to contact the outer circumferential surfaces 34a, 34b of the first and second rollers 22a, 22b. When used as entry guide rollers, the rollers 22a, 22b are positioned such that the material being treated is supported by being held at least partially in the circumferential recesses 38a, 38b of the guide rollers 22a, 22b. In this manner, the material being treated is supported, for example, against gravitational deformation, to assist in guiding the material from one station to the next, for example, from one rolling mill stand to the next.

In other embodiments of the invention, the annulus-shaped members and support members are formed in different configurations. Other embodiments are depicted in FIGS. 3 and 4, 5 and 6, 7 and 8, 9 and 10, and 11 and 12. In each of these embodiments, a roller 422, 622, 822, 1022, 1222 includes an annulus-shaped member 424, 624, 824, 1024, 1224 and a support member 426, 626, 826, 1026, 1226. The annulus-shaped members include first side surfaces 428, 628, 828, 1028, 1228, second side surfaces 432, 632, 832, 1032, 1232, outer circumferential surfaces 434, 634, 834, 1034, 1234, inner circumferential surfaces 436, 636, 836, 1036, 1236, circumferential recesses 438, 638, 838, 1038, 1238 and grooves 442, 642, 842, 1042, 1242. The support members include support plates 446, 646, 846, 1046, 1246, interior surfaces 454, 654, 854, 1054, 1254 and outer surfaces 458, 658, 858, 1058, 1258. Because of the differing purpose of the rollers, the depicted embodiments differ principally in the configuration of the annulus-shaped members, particularly the circumferential recesses 438, 638, 838, 1038, 1238; the diameter, axial length and radial thicknesses of the components and the configuration of the interior surface of the support members 426, 626, 826, 1026, 1226. The embodiment depicted in FIG. 1 contains no rib on the interior surface of the support member 1026. The annulus-shaped member 1224 of the embodiment depicted in FIG. 12 contains no circumferential recess.

In light of the above description, a number of advantages of the present invention can be seen. The present invention is long-lasting. In an application where metallic rollers had commonly had a lifetime of about ½ week, the roller according to the present invention has a lifetime of up to 9 months or more. In an application where a particular all-ceramic roller failed during threading of a heated copper rod between rollers, the roller of the present invention in substantially the same condition did not fail. The roller of the present invention is relatively easy to construct and relatively inexpensive to produce. The roller is relatively insensitive to thermal stress and capable of operating in hot and/or corrosive environments. The roller of the present invention has low rotational inertia reducing rotational friction and slippage with respect to the workpiece. The rollers of the present invention can be installed into existing apparatus with little or no alteration of the apparatus. As will be apparent to those skilled in the art, a number of variations or modifications of the described embodiments can be used. The rollers can be used in applications other than non-ferrous rolling mills including ferrous rolling mills and material moving devices. Rollers according to the present invention can be used in many applications other than as entry guide rollers, including 90 degree rollers, pinch rollers, shaping rollers, and slitter blades. Non-metallic materials having the necesary support characteristics can be used for forming support members, particularly in lower temperatures or less corrosive environments including materials such as plastics, resins, ceramics, reinforced or composite materials. The annulus-shaped member can include other materials in addition to ceramic including reinforcing materials, toughening materials, and sintering aids. The annulus-shaped member can be formed of a non-ceramic material, particularly in lower abrasive or lower temperature applications provided such material has the necessary hardness and temperature stability.

Although the present invention has been described with reference to certain embodiments, it should be appreciated that further modifications can be effected within the spirit and scope of the invention.

What is claimed is:

1. A ceramic roller comprising:
   an annulus-shaped member comprising a first ceramic material and having first and second side surfaces and outer and inner circumferential surfaces;
   a support member comprising a second material, different from said first ceramic material and having a support surface and being positioned such that said support surface is spaced from said inner surface to define a first space therebetween, wherein at least a portion of at least one of said first side surface and said second side surface extends radially outward from said support member;
   adhesive means comprising an epoxy in said first space for adhering to said inner surface and said support surface and for at least partially relieving stress on said annulus-shaped member.

2. A ceramic roller, as claimed in claim 1, further comprising bearing means for rotational mounting operably attached to said support member.

3. A roller, as claimed in claim 1, wherein:
   said first ceramic material comprises zirconia.

4. A roller, as claimed in claim 1, wherein said second material comprises a metal.

5. A roller, as claimed in claim 1, wherein said second material comprises steel.

6. A roller, as claimed in claim 1, wherein:
   said annulus-shaped member has at least one groove on said inner surface.

7. A process for providing a ceramic roller, comprising:
   providing an annulus-shaped member comprising a first ceramic material and having first and second side surfaces and outer and inner circumferential surfaces;
   providing a support member comprising a second material different from said ceramic material and having a support surface;
   adhering said support member to said annulus-shaped member using adhesive means comprising an epoxy between said support member and said annulus-shaped member to maintain said support surface in a position such that at least a portion of at least one of said first side surface and said second side surface extends radially outward from said support member, wherein at least a portion of said adhesive means is positioned between said support member and said annulus-shaped member to provide a thermal/mechanical stress barrier between said support member and said annulus-shaped member.

8. A process, as claimed in claim 7, wherein:
   said first ceramic material comprises zirconia.

9. A process, as claimed in claim 7, wherein:
   said second material comprises a metal.

10. A process, as claimed in claim 7, wherein:
    said second material comprises steel.

11. A process, as claimed in claim 7, wherein:
    said step of providing an annulus-shaped membe comprises forming at least one groove on said inne circumferential surface.

12. A process, as claimed in claim 7, further compris ing:
    press-fitting bearing means for rotational mounting t attach said bearing means to said support roller.

13. A ceramic roller comprising:
    an annulus-shaped member comprising zirconia hav ing first and second side surfaces and outer an inner circumferential surfaces and having at leas one groove on said inner surface;
    a support member comprising steel, having a suppor surface and being positioned such that such suppor surface is spaced from said inner surface to define first space therebetween, wherein said first an second side surfaces extend radially outward fror said support member;
    an epoxy material in said first space for adhering sai inner surface to said support surface and for pro viding a thermal/mechanical stress barrier betwee said support member and said annulus-shape member.

14. A process useful during rolling of a deformabl material comprising:
    providing first and second rollers, each of said firs and second rollers comprising:
       an annulus-shaped member comprising a first ce ramic material and having first and second sid surfaces and outer and inner circumferentia surfaces;
       a support member comprising a second materia different from said first ceramic material an having a support surface and being positione such that said support surface is spaced from sai inner surface, to define a first space therebe tween, wherein at least a portion of at least on of said first and second side surfaces extend radially outward from said support member;
       adhesive means comprising an epoxy in said firs space for adhering said inner surface to said sup port surface and for at least partially relievin stress on said annulus-shaped member;
    rotatably mounting said first and second rollers suc that aid outer circumferential surface of said firs roller is spaced from said outer circumferentia surface of said second roller to define a secon space therebetween;
    moving a portion of the deformable material throug said second space to contact said outer circumfe ential surfaces of said first and second rollers;
    heating said first and second rollers wherein stress produced by differential thermal expansion; and
    relieving said stress using aid adhesive means.

15. A ceramic roller comprising:
    an annulus-shaped member comprising a first cerami material and having first and second side surface and outer and inner circumferential surfaces;
    a support member comprising a second materia different from said first ceramic material and hav ing a support surface and being positioned suc that said support surface is spaced from said inne surface to define a first space therebetwee wherein at least a portion of at least one of said first side surface and said second side surface extends radially outward from said support member;

adhesive means comprising an epoxy in said first space for adhering to said inner surface and said support surface and for at least partially relieving stress on said annulus-shaped member;

wherein said ceramic roller is capable of withstanding operating temperatures of at least about 600° C.

16. A process for providing a ceramic roller, comprising:

providing an annulus-shaped member comprising a first ceramic material and having first and second side surfaces and outer and inner circumferential surfaces;

providing a support member comprising a second material different from said ceramic material and having a support surface;

adhering said support member to said annulus-shaped member using adhesive means comprising an epoxy between said support member and said annulus-shaped member to maintain said support surface in a position such that at least a portion of at least one of said first side surface and said second side surface extends radially outward from said support member, wherein at least a portion of said adhesive means is positioned between said support member and said annulus-shaped member to provide a thermal/mechanical stress barrier between said support member and said annulus-shaped member; and employing said ceramic roller in an environment wherein temperatures exceed at least about 600° C.

17. A ceramic roller comprising:

an annulus-shaped member comprising zirconia having first and second side surfaces and outer and inner circumferential surfaces and having at least one groove on said inner surface;

a support member comprising steel, having a support surface and being positioned such that such support surface is spaced from said inner surface to define a first space therebetween, wherein said first and second side surfaces extend radially outward from said support member;

an epoxy material in said first space for adhering said inner surface to said support surface and for providing a thermal/mechanical stress barrier between said support member and said annulus-shaped member;

wherein said ceramic roller is capable of operating at temperatures greater than about 600° C.

18. A process useful during rolling of a deformable material comprising:

providing first and second rollers, each of said first and second rollers comprising:

an annulus-shaped member comprising a first ceramic material and having first and second side surfaces and outer and inner circumferential surfaces;

a support member comprising a second material different from said first ceramic material and having a support surface and being positioned such that said support surface is spaced from said inner surface, to define a first space therebetween, wherein at least a portion of at least one of said first and second side surfaces extend radially outward from said support member;

adhesive means comprising an epoxy in said first space for adhering said inner surface to said support surface and for at least partially relieving stress on said annulus-shaped member;

rotatably mounting said first and second rollers such that said outer circumferential surface of said first roller is spaced from said outer circumferential surface of said second roller to define a second space therebetween;

moving a portion of the deformable material through said second space to contact said outer circumferential surfaces of said first and second rollers;

heating said first and second rollers to a temperature above about 600° C. wherein stress is produced by differential thermal expansion; and relieving said stress using said adhesive means.

19. A process useful during rolling of a deformable material comprising:

providing first and second rollers, each of said first and second rollers comprising:

an annulus-shaped member comprising a first ceramic material and having first and second side surfaces and outer and inner circumferential surfaces;

a support member comprising a second material different from said first ceramic material and having a support surface and being positioned such that said support surface is spaced from said inner surface, to define a first space therebetween, wherein at least a portion of at least one of said first and second side surfaces extend radially outward from said support member;

adhesive means comprising ana epoxy in said first space for adhering said inner surface to said support surface and for at least partially relieving stress on said annulus-shaped member;

rotatably mounting said first and second rollers such that said outer circumferential surface of said first roller is spaced from said outer circumferential surface of said second roller to define a second space therebetween;

moving a portion of the deformable material through said second space to contact said outer circumferential surfaces of said first and second rollers;

introducing stress on said first and second roller wherein said stress is produced by mechanical force; and relieving said stress using said adhesive means.

* * * * *

UNITED STATES PATENT AND TRADEMARK OFFICE
CERTIFICATE OF CORRECTION

PATENT NO. : 4,876,875

DATED : October 31, 1989

INVENTOR(S) : Rudyard J. Bruggeman & Gregory A. Carscallen

It is certified that error appears in the above-identified patent and that said Letters Patent is hereby corrected as shown below:

Column 1, line 58, delete ".C" and insert therefor --C.--.

Column 8, line 50, delete "aid" and insert therefor --said--.

Column 8, line 59, delete "aid" and insert therefor --said--.

Column 10, line 43, delete "ana" and insert therefor --an--.

Signed and Sealed this

Eighteenth Day of September, 1990

Attest:

HARRY F. MANBECK, JR.

*Attesting Officer*  *Commissioner of Patents and Trademarks*